May 22, 1934.                   E. B. THOMAS                   1,959,845
ABSORBENT MATERIAL AND METHOD OF MAKING THE SAME
Filed Oct. 11, 1927          3 Sheets-Sheet 1
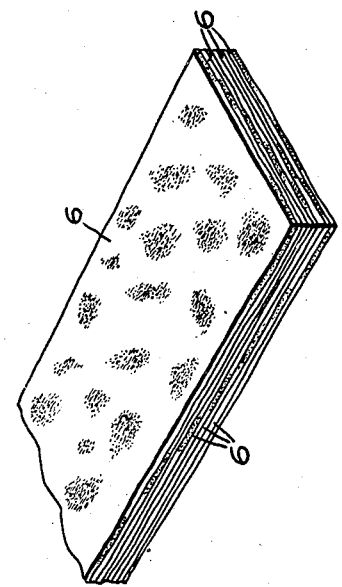
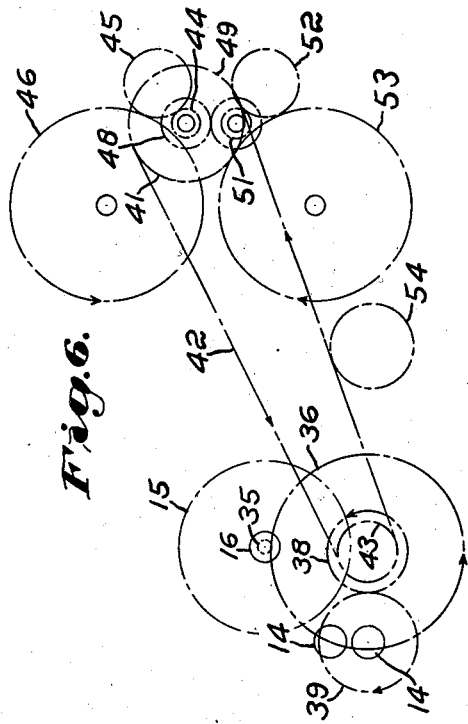
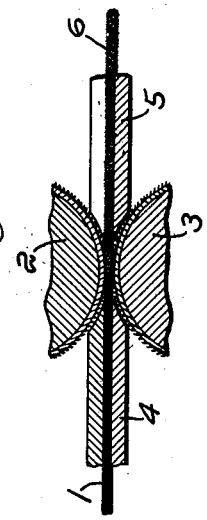
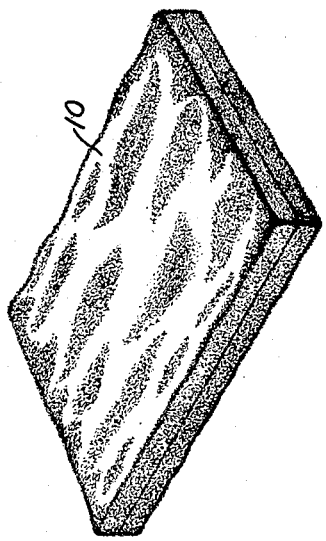
Inventor:
Errold B. Thomas,
by Emery, Booth, Janney & Varney
Attys.

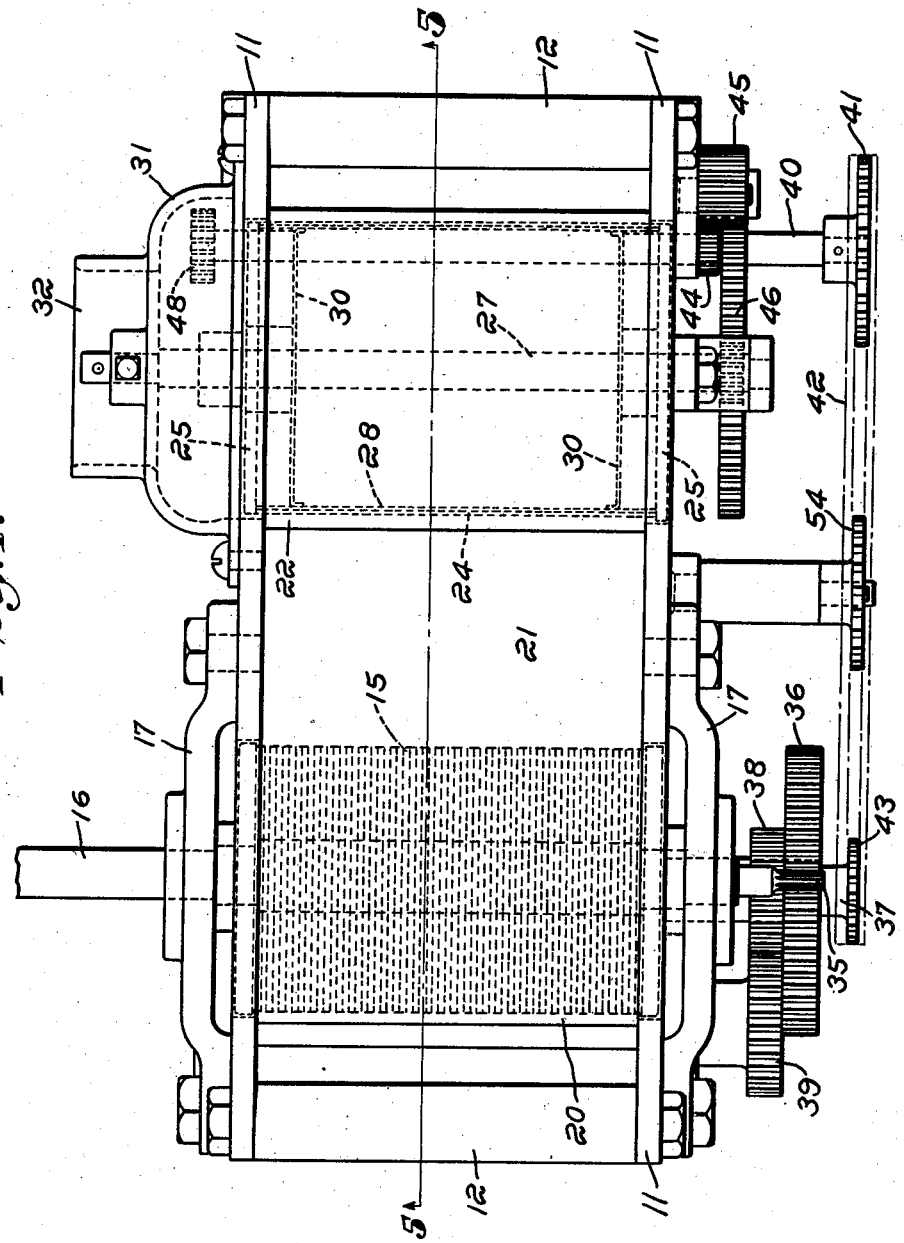

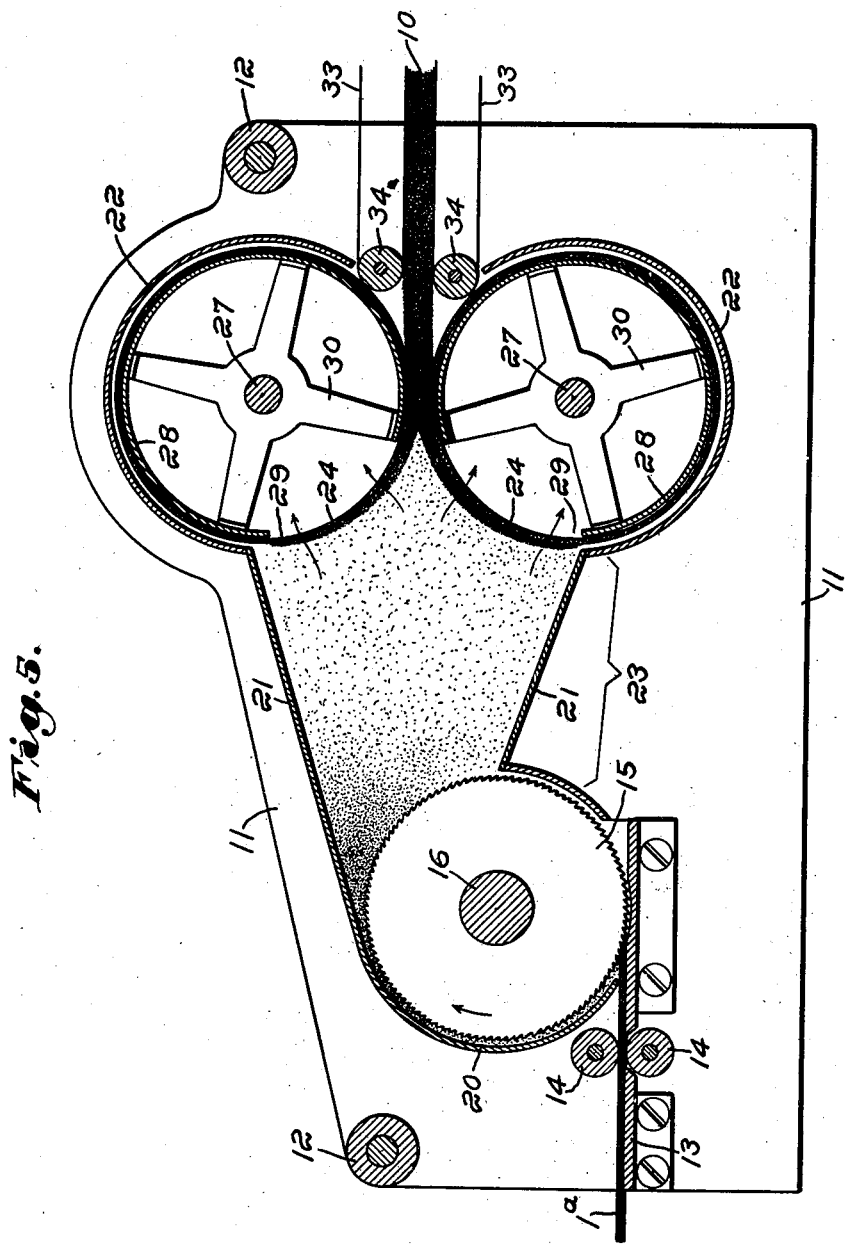

Patented May 22, 1934

1,959,845

UNITED STATES PATENT OFFICE 1,959,845

ABSORBENT MATERIAL AND METHOD OF MAKING THE SAME

Errold B. Thomas, Newton, Mass.

Application October 11, 1927, Serial No. 225,520

2 Claims. (Cl. 128—296)

My invention relates to absorbent materials and to packages or pads thereof, of general use for absorptive purposes but particularly adapted for use in sanitary napkins and the like. More particularly my invention aims to provide an improved and less expensive material and article of the class described, and includes a certain method of producing the same.

As to all common subject matter this application is a continuation of my copending application, Serial No. 77,786, filed December 26, 1925.

It has heretofore been proposed to employ in forming absorptive pads a relatively large plurality of layers or webs of extremely tenuous and film-like wood cellulose material, generally some thirty-five to forty of such webs being superposed. Said webs are each separately formed, and because of their extreme thinness require slow and careful handling during the process of manufacture and in forming the pads. They cannot be run rapidly through the rollers, drums and the like necessarily employed in the production of the same. The expense of manufacture is further increased by the fact that special machinery, or special and costly adaptation of the usual pulp handling machinery, is required.

For the purpose of decreasing manufacturing costs, and at the same time providing an improved product, in accordance with one form of my present invention, I employ a less number of layers or webs of wood or other cellulose which, while they may be thin as compared with the thickness of the absorbent pad as a whole, have sufficient substance and are of such consistency as to be susceptible of rapid handling and without the provision of special paper machinery. Or the material may be formed directly from the pulp or pulp-board as substantially a uniform mass of the thickness desired for the pad, or of two or a small plurality of layers more or less intimately united with each other to provide practically a single mass.

In the drawings showing illustrative embodiments of certain forms of my invention and typical means for practicing certain methods thereof:—

Fig. 1 is a vertical section showing a strip of cellulosic material such as a sheet or board resembling blotting paper, in the form in which it comes from the paper-making machinery, and illustrating one method of treating said sheet to render it suitable for use in absorbent packages;

Fig. 2 is a view, in perspective, of a plural-layer absorbent pad formed from the absorbent material of Fig. 1;

Fig. 3 illustrates a section of a somewhat modified form of material suitable for the formation of an absorbent pad, produced directly from pulp or pulp-board without necessary passage through paper-making machinery as contrasted with the pulp producing machinery;

Fig. 4 is a plan view of one means for producing the material of Fig. 3;

Fig. 5 is a vertical longitudinal section on the line 5—5 of Fig. 4; and

Fig. 6 is a gearing diagram of the mechanism of Figs. 4 and 5.

Referring now more particularly to the drawings, I have shown at the left in Fig. 1 a web, board, or sheet 1 of the wood or other cellulose material as it comes from the drums and rollers of the paper making machinery. At that time the sheet has substantially the consistency, form and surface characteristics of ordinary blotting paper, and is preferably of about the thickness of that product or somewhat thicker. It may be formed by means of the usual machinery employed in producing blotting paper and the like, without necessitating any rearrangement or costly change in such machinery, thus making it possible to use the same machines and to shift readily from the manufacture of the present product to another without additional expense. The cellulosic material of which said sheets are formed is preferably of the so called "alpha fibre" type, consisting of a soft wood pulp, such as spruce, from which practically all traces of pitch and tar have been removed, but other raw fibrous material may be employed, such as that derived from certain grasses and the like.

So far as I am aware cellulosic sheets of said form and character have not heretofore been employed or suggested for use in connection with absorptive packages for sanitary napkins or the like, and in the form so far described are wholly unsuited for such use because of their stiffness, harshness, surface matting of the fibres, etc. In accordance with the method of my invention, however, said sheets are rendered available for the purpose described.

As illustrated in Fig. 1, the sheets in their stiff, fibre-matted condition in which they come from the paper-forming machinery, but preferably dry or relatively so, as indicated at 1, are subjected to a softening, fluffing, napping, crumpling, or other like action spreading and separating the fibres, on both faces of the sheet. The means herein shown by way of example for effecting said operation comprises the upper and lower rolls 2, 3 rotatably supported in position to permit passage of the sheet between them, suitable guides 4, 5 for the sheet being provided. Said rolls have sheet-engaging surfaces formed of coarse sand-paper, radial wires, bristles, teeth, or the like, and preferably are driven at slightly different speeds so as to subject the sheets to a differential or brushing action in addition to the picking, napping, fluffing or like softening and surface-matting destroying action.

By said means and in accordance with this step in my method, the web 6 issuing from the delivery guide 5 is rendered extremely soft and pliable, having both faces fluffed and relieved of surface matting of the fibres. Both in appearance and to the touch the sheets thus treated resemble natural short-staple absorbent cotton wadding. I thus provide a material in web form which is admirably suited for use in absorbent packages, being clean, highly absorbent, and inexpensive in manufacture, and I desire to claim said material as such and particularly as adapted for use in sanitary napkins, together with the method of and means for making the same. An efficient absorptive package may be formed from about seven layers or webs superposed and cut to the desired size, as illustrated in Fig. 2; obviously a greater or less number of such layers may be employed if desired.

Referring now to Figs. 3 to 6, I have illustrated in Fig. 3 an absorptive fibrous or cellulosic material 10 formed from paper-makers' pulp, pulp board or the like fibrous raw material taken directly from the pulp-machines and before passage through the paper-making machinery, thus entirely dispensing with the paper-making process or step, although the use of material substantially similar to that employed in Figs. 1 and 2 is not precluded. In this instance the entire material is broken up into fibrous particles by suitable means resulting substantially in the separation of the material into its individual fibres or small groups of them. The latter are subsequently re-assembled into a wadding mass or batting-like web in which the fibres preferably have no predetermined arrangement but extend in all directions rather than predominantly in any given direction. Where wood pulp or other pulp board is comminuted the short staple fibres are thrown together with a minimum of matting, and adhere only sufficiently to preserve a mass form or body for the web and to be retained substantially without liability readily to "dust." The resulting material is an extremely soft, fluffy mass even more closely resembling natural cotton wadding than the material of Figs. 1 and 2, but of much higher absorptive efficiency than natural cotton wadding and much less expensive of manufacture.

In Figs. 4, 5 and 6 one means for producing this material is illustrated. Referring to said figures, the mechanism is suitably supported as by the side frames 11, 11 with interconnecting cross bars 12, 12. At the in-feeding end of the machine, that at the left in Figs. 4 and 5, is a material support or feed table 13 intermediate the side frames. The unworked cellulosic material 1ª, preferably pulp or pulp board as above stated and desirably dry or comparatively so is passed along said table by suitable means such as the feed rolls 14, 14, one or both of which is positively driven.

The material is brought into engagement with suitable shredding or comminuting means whereby it is torn apart into fibrous particles or individual fibres. For this purpose I have illustrated a gang of toothed or irregular-edged members, saws or shredders 15, 15, etc., rotatably mounted on a shaft 16 suitably journaled in brackets 17, 17 upon the opposite side frames. In the form illustrated said shaft 16 is extended to one side (see Fig. 4) and provided with any suitable means, not shown, such as a pulley or gear for the application of power, or it may be directly motor driven.

The rotary shredding mechanism described is enclosed within a hood or casing 20, which is in communication with a chute or passage 21 terminating in a second or collecting hood 22, said hoods and connecting passage comprising a substantially air-tight chamber 23. Within the latter, at the fibre-collecting and discharge end, are rotatably supported a pair of cylindrical screens 24, 24 having heads or ends 25, 25 provided centrally with supporting bearings rotatable respectively upon stationary shafts 27, 27, one for each screen.

Within each of the cylindrical screens is a similarly shaped imperforate shield or baffle 28, adjacent the surrounding screen and open or cut away at a portion facing the in-feeding end of the machine, as at 29. Said shields are held in fixed position in any suitable manner as by means of the spiders 20, 20, upon the respective stationary shafts 27, 27. At one end each of the cylindrical screens is perforated or otherwise formed to allow air passage. At that end, at the top in Fig. 4, the screens are in closed communication with an air outlet chamber 31 having a mouth 32 adapted to be placed in communication with a fan or other suction-creating means.

It will be understood that the entire mechanism including the shredding means and the two cylindrical screens are substantially in a closed air circuit provided by the casing 20, passage 21 and the hood or casing 32. An air current, draft or suction is set up, moving from the shredders or saws toward the screens and passing through the latter at the portions thereof then opposite the openings 29 of the respective shields 28. As the cylindrical screens are rotated, different portions of their surfaces are continuously placed opposite the openings 29 in the shields. The fibrous particles or fibres are thrown out by the shredders, driven in a clockwise direction as indicated by the arrow in Fig. 5, and, aided by the suction or air flow, are carried across to and collected upon the revolving cylindrical screens at their portions passing in front of the air openings in the screen shields 28. The screens are driven in opposite directions, and as the mass of fibres builds upon them it is fed outwardly between the screens. It will be noted that the thickness of the mass or web of absorbent material gradually increases toward the point at which the two layers collecting upon the respective screens converge and unite into substantially a single homogeneous mass 10. The thickness of the absorbent material and its compaction may be controlled by varying the speed of rotation of the cylindrical screens;—the more slowly the latter are driven, the more fibres are allowed to collect, with a resulting thicker or more compact web formation. There are also other controlling factors including the speed of the shredding means, the formation of the latter, that is, whether fine or relatively coarse toothed, the dimension of the screens, the size of opening in the screen shields, the degree of suction, etc. Means is preferably provided whereby these several controlling factors may be regulated and related as desired.

The absorbent fibrous mass or wadding 10 thus formed is conducted away from the screen in any preferred manner. Herein for the purpose I have illustrated upper and lower endless conveyors or travelling belts 33, 33, see Fig. 5, passing about the rolls 34, 34 and extending to any desired collecting point.

The two cylindrical screens are usually rotated at the same speed, but should it be desired to produce a wadding which is less dense at one surface than at the other, one or the other of the screens may have greater or less speed, resulting in a looser or closer wadding structure as desired. If a greater tensile strength is desired for the material than that resulting from the use of short staple fibres alone, such as those of ordinary paper-makers' pulp, various amounts of longer fibred material, such, for example, as relatively long staple natural cotton, may be mixed with the shorter fibres in any suitable manner, as by feeding such longer staple material to the shredding means with the pulp board.

The rotary movement and relative speeds of the described parts may be obtained in suitable manner, as by the gear mechanism shown in Fig. 4 and illustrated diagrammatically in Fig. 6. Referring to said figures, power is applied to the shredder shaft 16, herein at the end seen at the top in Fig. 4. At the opposite end of said shaft is a pinion 35 meshing with a larger gear 36 on a short shaft 37. Co-axial with said larger gear 36 is a smaller gear 38 with a similar but somewhat larger gear 39 on the hub of one of the feed rolls 14, herein the lower roll. Said mechanism operates the feeding and shredding means.

Near the opposite end of the machine is journaled in the side frames a cross-shaft 40 having upon one end, that at the lower portion of Fig. 4, a sprocket 41, receiving a chain 42 which passes over a similar but smaller sprocket 43 upon the short shaft 37 above mentioned. The two cylindrical screens are driven from said shaft 40, the upper one through a gear train including a pinion 44 upon the shaft meshing with a gear 45 carried upon the side frame and in turn meshing with a larger gear 46 connected with the bearing of the adjacent cylinder-screen head 25. The lower cylindrical screen is driven from said shaft 40 through a pinion 48 thereon at the other side of the machine and meshing with a similar pinion 49 on a second cross-shaft 50 carrying a pinion 51 which in turn drives a gear 52 similar to the gear 45 above mentioned and meshing with a large gear 53 secured to the adjacent head of the lower cylindrical screen. The rolls 34, 34 for delivery belts may be supported upon the shafts carrying the pinions 44 and 51, respectively. The ratios of the several gears may be varied to afford the different speeds desired, the gears for this purpose desirably being readily removable for replacement by other gears. An idler sprocket 54 may be provided to engage the lower run of the chain 42 and to take up any slack therein such as might result from an interchange of gears.

From the foregoing it will be understood that one method of my invention includes the steps of shredding fibrous material, preferably in the form of pulp or pulp board and thereby dispensing with the paper-making process, and subsequently collecting and reforming the fibres, without regard to the direction of their extent, into a sheetlike mass in which the compacting of the fibres is kept at the minimum possible, as by collecting them pneumatically upon movable screens from which the soft fluffy mass is discharged.

My invention is not limited to the particular embodiments thereof herein shown and described nor to the precise methods set forth, and the latter may be otherwise practiced than by the particular means illustrated, the scope of the invention being set forth in the following claims.

I claim:

1. Absorbent wadding initially formed in a plurality of inherently fibrously interlocked layers from a sheet of wood pulp comminuted into fibrous particles and subsequently collected and deposited pneumatically as a self-sustaining plural-layer wadding mass or sheet closely approximating in appearance natural cotton batting and wherein the fibers extend in no one direction predominantly and are sufficiently tenaciously related to each other to overcome any tendency to "dust," said plural-layer structure rendering the wadding more readily separable and disposable through usual toilet facilities but said pneumatically deposited initial plural-layer formation being effective inherently to retain the layers in their initial superposed position, under ordinary handling or use, by mutual interengagement and commingling of fibers thereof.

2. The method of manufacturing absorbent material in plural-layer form which comprises feeding substantially dry sheeted wood pulp, separating the pulp substantially into individual fibers, and collecting and depositing said fibers pneumatically simultaneously in a plurality of layers and during their continuing formation flatwise juxtaposing said layers into a self-sustaining plural-layer mass of substantially the consistency of natural cotton wadding.

ERROLD B. THOMAS.